United States Patent
Dong et al.

(10) Patent No.: US 9,949,287 B2
(45) Date of Patent: Apr. 17, 2018

(54) DOWNLINK TRANSMISSION METHOD IN HETEROGENEOUS NETWORK, CONTROL DEVICE, BASE STATION AND HETEROGENEOUS SYSTEM

(71) Applicant: Huawei Technologies Co., Ltd., Shenzhen (CN)

(72) Inventors: Wei Dong, Xi'an (CN); Kui Dai, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/947,889

(22) Filed: Nov. 20, 2015

(65) Prior Publication Data

US 2016/0081112 A1    Mar. 17, 2016

Related U.S. Application Data

(63) Continuation of application No. PCT/CN2014/074239, filed on Mar. 28, 2014.

(30) Foreign Application Priority Data

May 22, 2013  (CN) .......................... 2013 1 0196445

(51) Int. Cl.
*H04W 72/12* (2009.01)
*H04W 84/04* (2009.01)
(Continued)

(52) U.S. Cl.
CPC ........ *H04W 72/1289* (2013.01); *H04B 7/022* (2013.01); *H04L 5/0073* (2013.01);
(Continued)

(58) Field of Classification Search
CPC ............. H04W 72/082; H04W 28/048; H04W 84/045; H04W 36/04; H04W 88/08
See application file for complete search history.

(56) References Cited

U.S. PATENT DOCUMENTS

| 2012/0202542 A1* | 8/2012 | Dimou ................. H04W 24/02 455/509 |
| 2012/0307750 A1* | 12/2012 | Hunukumbure ...... H04W 16/10 370/329 |

(Continued)

FOREIGN PATENT DOCUMENTS

| CN | 101945482 A | 1/2011 |
| CN | 102202400 A | 9/2011 |

(Continued)

OTHER PUBLICATIONS

Bin Bin Chen et al., "Proportional Fairness for Overlapping Cells in Wireless Networks", Proc. IEEE Veh. Teohnol. Conf. (VTC-Fall 2006), Sep. 2012.

(Continued)

*Primary Examiner* — Raj Jain
(74) *Attorney, Agent, or Firm* — Leydig, Voit & Mayer, Ltd.

(57) ABSTRACT

The present invention provides a downlink transmission method in a heterogeneous network, a control device, a base station, and a heterogeneous system. The method includes: when one or more micro base stations need to schedule an edge user in an almost blank subframe ABS, determining, by a control device, at least one micro base station that needs to transmit information to the edge user jointly with a macro base station from the one or more micro base stations; and instructing, by the control device, the macro base station and the micro base station that needs to transmit information to the edge user jointly with the macro base station, to transmit information to the edge user in the ABS. Embodiments of the present invention can avoid a resource waste of the macro base station, and enhance system performance.

16 Claims, 5 Drawing Sheets

(51) Int. Cl.
*H04B 7/022* (2017.01)
*H04L 5/00* (2006.01)
*H04W 36/00* (2009.01)

(52) U.S. Cl.
CPC ... *H04W 36/0072* (2013.01); *H04W 72/1278* (2013.01); *H04W 84/045* (2013.01); *H04W 72/1257* (2013.01)

(56) References Cited

U.S. PATENT DOCUMENTS

| | | | |
|---|---|---|---|
| 2013/0210447 A1* | 8/2013 | Moe | H04W 72/0486 455/453 |
| 2013/0286849 A1 | 10/2013 | Park | |
| 2014/0044053 A1 | 2/2014 | Kimura | |
| 2014/0133365 A1 | 5/2014 | Peng et al. | |
| 2014/0187263 A1 | 7/2014 | Geng et al. | |
| 2014/0211734 A1* | 7/2014 | Seo | H04J 11/0056 370/329 |
| 2014/0269457 A1* | 9/2014 | Folke | H04W 72/082 370/280 |
| 2014/0307648 A1 | 10/2014 | Nagata et al. | |
| 2016/0081112 A1* | 3/2016 | Dong | H04B 7/022 370/329 |

FOREIGN PATENT DOCUMENTS

| | | |
|---|---|---|
| CN | 102594489 A | 7/2012 |
| CN | 102932928 A | 2/2013 |
| CN | 102938661 A | 2/2013 |
| CN | 103281733 A | 9/2013 |
| JP | 2012244477 A | 12/2012 |
| JP | 2013042342 A | 2/2013 |
| KR | 20120080493 A | 7/2012 |
| KR | 20120081819 A | 7/2012 |
| WO | WO 2011118993 A2 | 9/2011 |
| WO | WO 2011122833 A2 | 10/2011 |
| WO | WO 2012093858 A2 | 7/2012 |
| WO | WO 2012096449 A2 | 7/2012 |

OTHER PUBLICATIONS

"Discussion on Measurement Restriction Requirement of eICIC," 3GPP TSG RAN WG2 Meeting #72, Jacksonville, Florida, R2-106534, 3rd Generation Partnership Project, Valbonne, France (Nov. 15-19, 2010).

Geirhofer et al., "Coordinated Multi Point Transmission in 3GPP LTE Heterogeneous Networks," GC'12 Workshop: International Workshop on Emerging Technologies for LTE-Advanced and Beyond-4G, pp. 608-612, Institute of Electrical and Electronics Engineers, New York, New York (2012).

Li et al., "CoMP and Interference Coordination in Heterogeneous Network for LTE-Advanced," GC'12 Workshop: Multicell Cooperation, pp. 1107-1111, Institute of Electrical and Electronics Engineers, New York, New York (2012).

Bedekar et al., "Optimal Muting and Load Balancing for eICIC," 11th International Symposium and Workshops on Modeling and Optimization in Mobile, Ad Hoc and Wireless Networks (WiOpt), pp. 280-287, Institute of Electrical and Electronics Engineers, New York, New York (May 13-17, 2013).

* cited by examiner

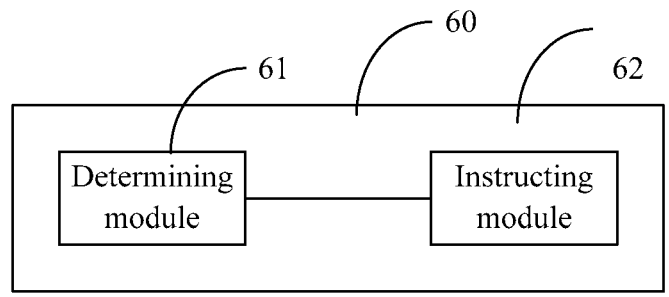

FIG. 6

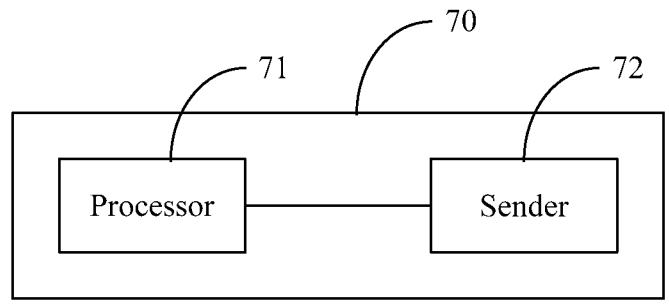

FIG. 7

A base station acquires indication information generated by a control device, where the indication information is generated after the control device determines a micro base station that needs to transmit, jointly with a macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in an ABS /81

The base station transmits information to the edge user in the ABS according to the indication information /82

FIG. 8

DOWNLINK TRANSMISSION METHOD IN HETEROGENEOUS NETWORK, CONTROL DEVICE, BASE STATION AND HETEROGENEOUS SYSTEM

CROSS-REFERENCE TO RELATED APPLICATION

This application is a continuation of International Patent Application No. PCT/CN2014/074239, filed on Mar. 28, 2014, which claims priority to Chinese Patent Application No. 201310196445.7, filed on May 22, 2013, both of which are hereby incorporated by reference in their entireties.

TECHNICAL FIELD

The present invention relates to communications technologies, and in particular, to a downlink transmission method in a heterogeneous network, a control device, a base station, and a heterogeneous system.

BACKGROUND

A typical wireless cellular network is constructed by base stations having transmit power and coverage of the same level, and may be classified as a homogeneous network. The transmit power and coverage of the same level refer to that the transmit power and the coverage are basically the same, or a difference in transmit power and a difference in coverage fall within set ranges. To further improve capacity and coverage performance, some low power stations (LPN) may be added within a deployment range of a macro base station (Macro eNB), and stations of different power constitute a heterogeneous network. The low power station may also be referred to as a micro base station. The purpose of deploying a micro base station lies in two aspects: improving coverage performance and increasing network capacity. When the micro base station is used to improve coverage performance, the micro base station may be deployed in a weak coverage area of a macro base station. When the micro base station is used to increase network capacity, the micro base station may be deployed in a traffic hotspot area. Because the traffic hotspot area may be located at a position with good signal quality near the center of the macro base station, when the micro base station is deployed at the position near the center of the macro base station, to allow the micro base station to cover as many user equipments (UE) as possible and expand the coverage of the micro base station, a cell range expansion (CRE) function is introduced.

The principle of the CRE function is not to change transmit power of the micro base station, but to configure a handover parameter, and add a configuration for a corresponding threshold, so as to make it easier to hand over the UE to the micro base station and make it more difficult to hand over the UE from the micro base station. By the foregoing operations, the coverage of the micro base station is expanded, but edge users of the micro base station are closer to the macro base station, and uplink and downlink interference between the macro base station and the micro base station is increased.

For the downlink interference from the macro base station to the micro base station, an enhanced inter-cell interference coordination (eICIC) technology is introduced. In eICIC, the macro base station sets an almost blank subframe (ABS), the micro base station schedules its edge user in the ABS, and the macro base station does not schedule a user of the macro base station in the ABS. In this way, the interference from the macro base station to the edge user of the micro base station is reduced, but a resource of the macro base station is wasted.

SUMMARY

In view of this, embodiments of the present invention provide a downlink transmission method in a heterogeneous network, a control device, a base station, and a heterogeneous system, so as to solve a problem in the prior art that a resource of a macro base station is wasted.

According to a first aspect, a downlink transmission method in a heterogeneous network is provided, including:

when one or more micro base stations need to schedule an edge user in an almost blank subframe ABS, determining, by a control device, at least one micro base station that needs to transmit information to the edge user jointly with a macro base station from the one or more micro base stations; and instructing, by the control device, the macro base station and the micro base station that needs to transmit information to the edge user jointly with the macro base station, to transmit information to the edge user in the ABS.

With reference to the first aspect, in a first possible implementation manner of the first aspect, the determining, by a control device, at least one micro base station that needs to transmit information to the edge user jointly with a macro base station from the one or more micro base stations includes:

when the number of micro base stations that schedule the edge user in the ABS is one, determining that the micro base station that schedules the edge user in the ABS is the micro base station that needs to transmit information to the edge user jointly with the macro base station; or when the number of micro base stations that schedule the edge user in the ABS is at least two, determining a combination mode, and determining, according to a utility function value of the combination mode, the micro base station that needs to transmit information to the edge user jointly with the macro base station, where the combination mode is used to indicate whether each micro base station transmits information to the edge user jointly with the macro base station.

With reference to the first possible implementation manner of the first aspect, in a second possible implementation manner of the first aspect, the determining a combination mode, and determining, according to a utility function value of the combination mode, the micro base station that needs to transmit information to the edge user jointly with the macro base station includes:

corresponding to each resource block group (RBG) in the ABS, determining multiple combination modes according to whether each micro base station transmits information to the edge user jointly with the macro base station in the RBG;

determining a utility function value of each combination mode according to a rate at which each micro base station transmits information in the RBG to the edge user scheduled by the micro base station; and determining, according to a combination mode with a largest utility function value, the micro base station that needs to transmit information to the edge user jointly with the macro base station.

With reference to the second possible implementation manner of the first aspect, in a third possible implementation manner of the first aspect, the determining a utility function value of each combination mode according to a rate at which each micro base station transmits information in the RBG to the edge user scheduled by the micro base station is:

$$f_i = \sum_{j=1}^{N} PF_j, \text{ or } f_i = \sum_{j=1}^{N} (R\_ins)_j,$$

where: $f_i$ denotes a utility function value of an $i^{th}$ combination mode, $PF_j$ denotes a proportional fair PF parameter of an edge user scheduled by a $j^{th}$ micro base station in the $i^{th}$ combination mode, N is the number of micro base stations that schedule the edge user in the ABS, and a calculation formula of $PF_j$ is:

$$PF_j = \frac{(R\_ins)_j}{(R\_avg)_j},$$

where: $(R\_ins)_j$ denotes an instantaneous rate of the edge user scheduled in the RBG by the $j^{th}$ micro base station in the $i^{th}$ combination mode, and $(R\_avg)_j$ denotes an average rate of the edge user scheduled in the RBG by the $j^{th}$ micro base station in the $i^{th}$ combination mode.

With reference to the first aspect or any one of the first to third possible implementation manners of the first aspect, in a fourth possible implementation manner of the first aspect, the instructing the macro base station and the micro base station that needs to transmit information to the edge user jointly with the macro base station, to transmit information to the edge user in the ABS includes:

determining a first weight value corresponding to the macro base station and a second weight value corresponding to each micro base station, sending the first weight value corresponding to the macro base station to the macro base station, and sending the second weight value corresponding to each micro base station to each micro base station, so that the macro base station and each micro base station jointly transmit information to the edge user according to the first weight value and the second weight value corresponding to each micro base station separately, where each micro base station is each micro base station that needs to transmit information to the edge user jointly with the macro base station.

With reference to the fourth possible implementation manner of the first aspect, in a fifth possible implementation manner of the first aspect, the determining a first weight value corresponding to the macro base station and a second weight value corresponding to each micro base station includes:

when the number of micro base stations that need to transmit information to the edge user jointly with the macro base station is one, estimating a first channel matrix between the edge user and the macro base station, and a second channel matrix between the edge user and the micro base station that needs to transmit information to the edge user jointly with the macro base station; and performing singular value decomposition (SVD) on a transpose of the first channel matrix to obtain the first weight value corresponding to the macro base station, and performing SVD on a transpose of the second channel matrix to obtain the second weight value corresponding to the micro base station that needs to transmit information to the edge user jointly with the macro base station; or when the number of micro base stations that simultaneously need to transmit information to the edge user jointly with the macro base station is at least two, estimating, corresponding to each micro base station and each scheduled edge user, a channel matrix between each edge user scheduled by each micro base station and the macro base station to obtain a first channel matrix corresponding to each micro base station, and estimating a second channel matrix between each edge user scheduled by each micro base station and each micro base station; and performing SVD on a transpose of the first channel matrix corresponding to each micro base station to obtain multiple first weight values, performing orthogonalization processing on the multiple first weight values to obtain the first weight value corresponding to the macro base station, where the first weight value includes a first weight value corresponding to each micro base station, and performing SVD on a transpose of the second channel matrix to obtain the second weight value corresponding to each micro base station.

According to a second aspect, a control device is provided, including:

a determining module, configured to: when one or more micro base stations need to schedule an edge user in an almost blank subframe ABS, determine, by the control device, at least one micro base station that needs to transmit information to the edge user jointly with a macro base station from the one or more micro base stations; and an instructing module, configured to instruct the macro base station and the micro base station that needs to transmit information to the edge user jointly with the macro base station, to transmit information to the edge user in the ABS.

With reference to the second aspect, in a first possible implementation manner of the second aspect, the determining module is specifically configured to:

when the number of micro base stations that schedule the edge user in the ABS is one, determine that the micro base station that schedules the edge user in the ABS is the micro base station that needs to transmit information to the edge user jointly with the macro base station; or when the number of micro base stations that schedule the edge user in the ABS is at least two, determine a combination mode, and determine, according to a utility function value of the combination mode, the micro base station that needs to transmit information to the edge user jointly with the macro base station, where the combination mode is used to indicate whether each micro base station transmits information to the edge user jointly with the macro base station.

With reference to the first possible implementation manner of the second aspect, in a second possible implementation manner of the second aspect, the determining module is specifically configured to:

corresponding to each resource block group RBG in the ABS, determine multiple combination modes according to whether each micro base station transmits information to the edge user jointly with the macro base station in the RBG;

determine a utility function value of each combination mode according to a rate at which each micro base station transmits information in the RBG to the edge user scheduled by the micro base station; and determine, according to a combination mode with a largest utility function value, the micro base station that needs to transmit information to the edge user jointly with the macro base station.

With reference to the second possible implementation manner of the second aspect, in a third possible implementation manner of the second aspect, the utility function value determined by the determining module is:

$$f_i = \sum_{j=1}^{N} PF_j, \text{ or } f_i = \sum_{j=1}^{N} (R\_ins)_j,$$

where: $f_i$ denotes a utility function value of an $i^{th}$ combination mode, $PF_j$ denotes a proportional fair PF parameter of an edge user scheduled by a $j^{th}$ micro base station in the $i^{th}$ combination mode, N is the number of micro base stations that schedule the edge user in the ABS, and a calculation formula of $PF_j$ is:

$$PF_j = \frac{(R\_ins)_j}{(R\_avg)_j},$$

where: $(R\_ins)_j$ denotes an instantaneous rate of the edge user scheduled in the RBG by the $j^{th}$ micro base station in the $i^{th}$ combination mode, and $(R\_avg)_j$ denotes an average rate of the edge user scheduled in the RBG by the $j^{th}$ micro base station in the $i^{th}$ combination mode.

With reference to the second aspect or any one of the first to third possible implementation manners of the second aspect, in a fourth possible implementation manner of the second aspect, the determining module is further configured to determine a first weight value corresponding to the macro base station and a second weight value corresponding to each micro base station, where each micro base station is each micro base station that needs to transmit information to the edge user jointly with the macro base station; and the instructing module is further configured to send the first weight value corresponding to the macro base station to the macro base station, and send the second weight value corresponding to each micro base station to each micro base station, so that the macro base station and each micro base station jointly transmit information to the edge user according to the first weight value and the second weight value corresponding to each micro base station separately.

With reference to the fourth possible implementation manner of the second aspect, in a fifth possible implementation manner of the second aspect, the determining module is specifically configured to:

when the number of micro base stations that need to transmit information to the edge user jointly with the macro base station is one, estimate a first channel matrix between the edge user and the macro base station, and a second channel matrix between the edge user and the micro base station that needs to transmit information to the edge user jointly with the macro base station; and perform singular value decomposition SVD on a transpose of the first channel matrix to obtain the first weight value corresponding to the macro base station, and perform SVD on a transpose of the second channel matrix to obtain the second weight value corresponding to the micro base station that needs to transmit information to the edge user jointly with the macro base station; or when the number of micro base stations that simultaneously need to transmit information to the edge user jointly with the macro base station is at least two, estimate, corresponding to each micro base station and each scheduled edge user, a channel matrix between each edge user scheduled by each micro base station and the macro base station to obtain a first channel matrix corresponding to each micro base station, and estimate a second channel matrix between each edge user scheduled by each micro base station and each micro base station; and perform SVD on a transpose of the first channel matrix corresponding to each micro base station to obtain multiple first weight values, perform orthogonalization processing on the multiple first weight values to obtain the first weight value corresponding to the macro base station, where the first weight value includes a first weight value corresponding to each micro base station, and perform SVD on a transpose of the second channel matrix to obtain the second weight value corresponding to each micro base station.

According to a third aspect, a downlink transmission method in a heterogeneous network is provided, including:

acquiring, by a base station, indication information generated by a control device, where the indication information is generated after the control device determines a micro base station that needs to transmit, jointly with a macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in an almost blank subframe ABS; and transmitting, by the base station, information to the edge user in the ABS according to the indication information.

With reference to the third aspect, in a first possible implementation manner of the third aspect, before the transmitting, by the base station, information to the edge user in the ABS according to the indication information, the method further includes:

acquiring, by the base station, a weight value obtained by the control device, where the weight value is obtained after the control device performs singular value decomposition SVD on a transpose of a channel matrix between the base station and the edge user; and the transmitting information to the edge user in the ABS includes:

transmitting information to the edge user in the ABS according to the weight value.

With reference to the first possible implementation manner of the third aspect, in a second possible implementation manner of the third aspect, when the base station is the macro base station, and the number of micro base stations that simultaneously need to transmit information to the edge user jointly with the macro base station is at least two, the weight value acquired by the macro base station includes mutually orthogonal weight values corresponding to each micro base station.

According to a fourth aspect, a base station is provided, including:

an acquiring module, configured to acquire indication information generated by a control device, where the indication information is generated after the control device determines a micro base station that needs to transmit, jointly with a macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in an almost blank subframe ABS; and a processing module, configured to transmit information to the edge user in the ABS according to the indication information.

With reference to the fourth aspect, in a first possible implementation manner of the fourth aspect, the acquiring module is further configured to acquire a weight value obtained by the control device, where the weight value is obtained after the control device performs singular value decomposition SVD on a transpose of a channel matrix between the base station and the edge user; and the processing module is specifically configured to transmit information to the edge user in the ABS according to the weight value and the indication information.

With reference to the first possible implementation manner of the fourth aspect, in a second possible implementation manner of the fourth aspect, when the base station is the macro base station, and the number of micro base stations that simultaneously need to transmit information to the edge user jointly with the macro base station is at least two, the weight value acquired by the acquiring module includes mutually orthogonal weight values corresponding to each micro base station.

According to a fifth aspect, a heterogeneous system is provided, including:

a macro base station and a micro base station; where the macro base station is configured to transmit information to an edge user of the micro base station in an almost blank subframe ABS according to indication information generated by a control device; and the micro base station is configured to transmit information to the edge user in the ABS according to indication information generated by the control device, where the indication information is generated after the control device determines a micro base station that needs to transmit, jointly with the macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in the almost blank subframe ABS.

With reference to the fifth aspect, in a first possible implementation manner of the fifth aspect, the macro base station is further configured to acquire a first weight value obtained by the control device, where the first weight value is obtained after the control device performs singular value decomposition SVD on a transpose of a first channel matrix between the edge user and the macro base station, so as to transmit information to the edge user by using the first weight value in the ABS according to the indication information; and the micro base station is further configured to acquire a second weight value sent by the control device, where the second weight value is obtained after the control device performs SVD on a transpose of a second channel matrix between the edge user and the micro base station, so as to transmit information to the edge user by using the second weight value in the ABS according to the indication information.

With reference to the first possible implementation manner of the fifth aspect, in a second possible implementation manner of the fifth aspect, when the number of micro base stations that simultaneously need to transmit information to the edge user jointly with the macro base station is at least two, the first weight value acquired by the macro base station includes mutually orthogonal weight values corresponding to each micro base station that simultaneously needs to transmit information to the edge user jointly with the macro base station.

According to a sixth aspect, a control device is provided, including:

a processor, configured to: when one or more micro base stations need to schedule an edge user in an almost blank subframe ABS, determine, by the control device, at least one micro base station that needs to transmit information to the edge user jointly with a macro base station from the one or more micro base stations; and a sender, configured to instruct the macro base station and the micro base station that needs to transmit information to the edge user jointly with the macro base station, to transmit information to the edge user in the ABS.

With reference to the sixth aspect, in a first possible implementation manner of the sixth aspect, the processor is specifically configured to:

when the number of micro base stations that schedule the edge user in the ABS is one, determine that the micro base station that schedules the edge user in the ABS is the micro base station that needs to transmit information to the edge user jointly with the macro base station; or when the number of micro base stations that schedule the edge user in the ABS is at least two, determine a combination mode, and determine, according to a utility function value of the combination mode, the micro base station that needs to transmit information to the edge user jointly with the macro base station, where the combination mode is used to indicate whether each micro base station transmits information to the edge user jointly with the macro base station.

With reference to the first possible implementation manner of the sixth aspect, in a second possible implementation manner of the sixth aspect, the processor is specifically configured to:

corresponding to each resource block group RBG in the ABS, determine multiple combination modes according to whether each micro base station transmits information to the edge user jointly with the macro base station in the RBG;

determine a utility function value of each combination mode according to a rate at which each micro base station transmits information in the RBG to the edge user scheduled by the micro base station; and determine, according to a combination mode with a largest utility function value, the micro base station that needs to transmit information to the edge user jointly with the macro base station.

With reference to the second possible implementation manner of the sixth aspect, in a third possible implementation manner of the sixth aspect, the utility function value determined by the processor is:

$$f_i = \sum_{j=1}^{N} PF_j, \text{ or } f_i = \sum_{j=1}^{N} (\text{R\_ins})_j,$$

where: $f_i$ denotes a utility function value of an $i^{th}$ combination mode, $PF_j$ denotes a proportional fair PF parameter of an edge user scheduled by a $j^{th}$ micro base station in the $i^{th}$ combination mode, N is the number of micro base stations that schedule the edge user in the ABS, and a calculation formula of $PF_j$ is:

$$PF_j = \frac{(\text{R\_ins})_j}{(\text{R\_avg})_j},$$

where: $(\text{R\_ins})_j$ denotes an instantaneous rate of the edge user scheduled in the RBG by the $j^{th}$ micro base station in the $i^{th}$ combination mode, and $(\text{R\_avg})_j$ denotes an average rate of the edge user scheduled in the RBG by the $j^{th}$ micro base station in the $i^{th}$ combination mode.

With reference to the sixth aspect or any one of the first to third possible implementation manners of the sixth aspect, in a fourth possible implementation manner of the sixth aspect, the processor is further configured to determine a first weight value corresponding to the macro base station and a second weight value corresponding to each micro base station; and the sender is further configured to send the first weight value corresponding to the macro base station to the macro base station, and send the second weight value corresponding to each micro base station to each micro base station, so that the macro base station and each micro base station jointly transmit information to the edge user according to the first weight value and the second weight value corresponding to each micro base station separately, where each micro base station is each micro base station that needs to transmit information to the edge user jointly with the macro base station.

With reference to the fourth possible implementation manner of the sixth aspect, in a fifth possible implementation manner of the sixth aspect, the processor is specifically configured to:

when the number of micro base stations that need to transmit information to the edge user jointly with the macro base station is one, estimate a first channel matrix between the edge user and the macro base station, and a second channel matrix between the edge user and the micro base station that needs to transmit information to the edge user jointly with the macro base station; and perform singular value decomposition SVD on a transpose of the first channel matrix to obtain the first weight value corresponding to the macro base station, and perform SVD on a transpose of the second channel matrix to obtain the second weight value corresponding to the micro base station that needs to transmit information to the edge user jointly with the macro base station; or when the number of micro base stations that simultaneously need to transmit information to the edge user jointly with the macro base station is at least two, estimate, corresponding to each micro base station and each scheduled edge user, a channel matrix between each edge user scheduled by each micro base station and the macro base station to obtain a first channel matrix corresponding to each micro base station, and estimate a second channel matrix between each edge user scheduled by each micro base station and each micro base station; and perform SVD on a transpose of the first channel matrix corresponding to each micro base station to obtain multiple first weight values, perform orthogonalization processing on the multiple first weight values to obtain the first weight value corresponding to the macro base station, where the first weight value includes a first weight value corresponding to each micro base station, and perform SVD on a transpose of the second channel matrix to obtain the second weight value corresponding to each micro base station.

According to a seventh aspect, a base station is provided, including:

a receiver, configured to acquire indication information generated by a control device, where the indication information is generated after the control device determines a micro base station that needs to transmit, jointly with a macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in an almost blank subframe ABS; and a processor, configured to transmit information to the edge user in the ABS according to the indication information.

With reference to the seventh aspect, in a first possible implementation manner of the seventh aspect, the receiver is further configured to acquire a weight value obtained by the control device, where the weight value is obtained after the control device performs singular value decomposition SVD on a transpose of a channel matrix between the base station and the edge user; and the processor is specifically configured to transmit information to the edge user in the ABS according to the weight value and the indication information.

With reference to the first possible implementation manner of the seventh aspect, in a second possible implementation manner of the seventh aspect, when the base station is the macro base station, and the number of micro base stations that simultaneously need to transmit information to the edge user jointly with the macro base station is at least two, the weight value acquired by the receiver includes mutually orthogonal weight values corresponding to each micro base station.

According to the foregoing technical solutions, in the embodiments of the present invention, macro-micro joint transmission is performed for the edge user of the micro base station, which can avoid a resource waste problem caused by that the macro base station does not send data in the ABS, and can reduce the resource loss of the macro base station. In addition, macro-micro joint transmission can further improve edge user performance and enhance eICIC (Enhanced Inter-Cell Interference Coordination, enhanced intercell interference coordination) performance.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1b is a schematic structural diagram of the heterogeneous network corresponding to FIG. 1a;

FIG. 6 is a schematic structural diagram of a control device provided in an embodiment of the present invention;

FIG. 7 is a schematic structural diagram of another control device provided in an embodiment of the present invention;

FIG. 8 is a schematic flowchart of another downlink transmission method in a heterogeneous network provided in an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments derived by persons of ordinary skill in the art based on the embodiments of the present invention without creative efforts shall fall within the protection scope of the present invention.

Figure 1A:
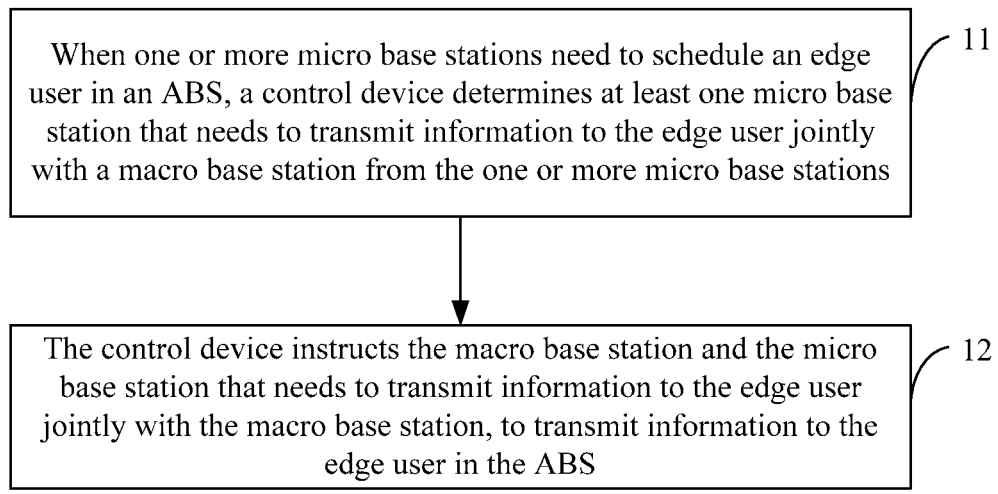
FIG. 1a is a schematic flowchart of a downlink transmission method in a heterogeneous network provided in an embodiment of the present invention.
Figure 1B:
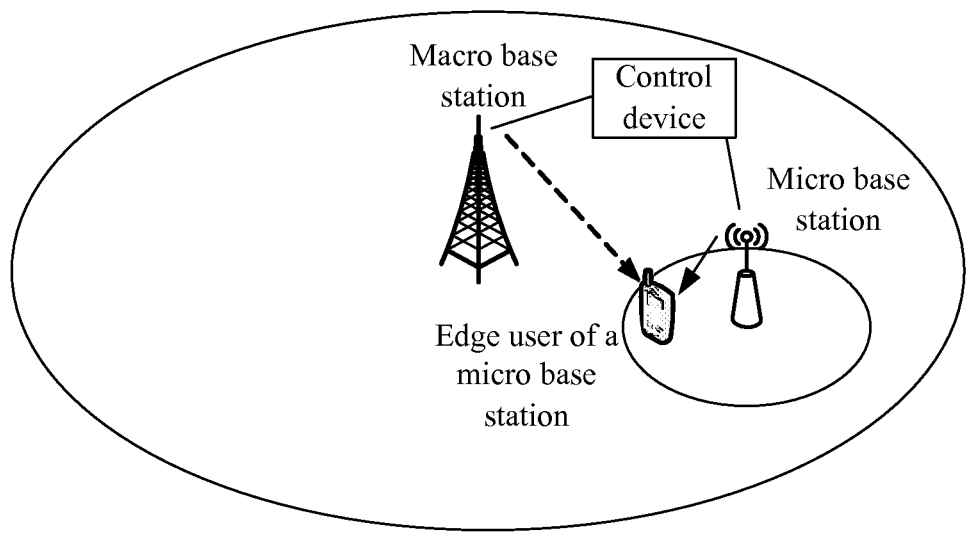

FIG. 1a is a schematic flowchart of a downlink transmission method in a heterogeneous network provided in an embodiment of the present invention, and FIG. 1b is a schematic structural diagram of the heterogeneous network corresponding to FIG. 1a.

Referring to FIG. 1b, an embodiment of the present invention provides a heterogeneous network, where the heterogeneous network includes a macro base station, a micro base station, and a control device. The macro base station refers to a station whose transmit power is greater than transmit power of the micro base station. For example, the macro base station may be a Macro eNB, and the micro base station may be a Pico or Femto. An edge user of the micro base station refers to that a difference between a path loss (path loss) from the user to the micro base station and a path loss from the user to the macro base station falls within a set range, for example, less than 10 dB. The control device refers to a device that can centrally control the micro base station and the macro base station. For example, the control device may be located in a base band unit (Base Band Unit, BBU), and the control device may communicate with the macro base station and the micro base station by using an interface such as an optical fiber.

Referring to FIG. 1a, a procedure of this embodiment may include:

11: When one or more micro base stations need to schedule an edge user in an ABS, a control device determines at least one micro base station that needs to transmit information to the edge user jointly with a macro base station from the one or more micro base stations.

Herein, the control device may be a device that controls the macro base station and the micro base station, and the control device may be disposed independent of the macro base station and the micro base station, or may be located in the macro base station or the micro base station. The control device is, for example, located in a baseband processing unit (Base Band Unit, BBU), and the macro base station and the micro base station may share the BBU.

In this embodiment of the present invention, a micro base station that needs to transmit information to an edge user jointly with a macro base station may be briefly referred to as a micro base station that needs to perform joint transmission with a macro base station. In a heterogeneous network, one or at least two micro base stations may be configured to perform user scheduling in an ABS, and one or more of these micro base stations may be a micro base station that needs to perform joint transmission with a macro base station.

It should be understood that, in this embodiment of the present invention, "joint transmission" may refer to that a macro base station and a micro base station jointly transmit information to an edge user of the micro base station. During specific transmission, the macro base station and the micro base station may use different weight values. For example, a weight value corresponding to the macro base station is w1, a weight value corresponding to the micro base station is w2, and information to be jointly transmitted by the macro base station and the micro base station is x. In this case, information transmitted by the macro base station to the edge user is w1×x, and information transmitted by the micro base station to the edge user is w2×x.

It should be understood that, in this embodiment of the present invention, "transmitting information" may also be referred to as "transmitting a signal", "transmitting data", or the like.

Optionally, the determining, by a control device, at least one micro base station that needs to transmit information to the edge user jointly with a macro base station from the one or more micro base stations may include:

when the number of micro base stations that schedule the edge user in the ABS is one, determining that the micro base station that schedules the edge user in the ABS is the micro base station that needs to transmit information to the edge user jointly with the macro base station; or when the number of micro base stations that schedule the edge user in the ABS is at least two, determining a combination mode, and determining, according to a utility function value of the combination mode, the micro base station that needs to transmit information to the edge user jointly with the macro base station, where the combination mode is used to indicate whether each micro base station transmits information to the edge user jointly with the macro base station.

The number of micro base stations that schedule the edge user in the ABS may be detected by the control device.

The combination mode may be determined according to cases of combinations of whether at least two micro base stations perform joint transmission with the macro base station. For example, there are two cases whether each micro base station performs joint transmission with the macro base station, that is, non joint transmission and joint transmission, and then cases corresponding to multiple micro base stations are combined to obtain multiple combination modes. For example, when the number of micro base stations is two, there are four cases of combinations, that is, the first micro base station does not perform joint transmission with the macro base station and the second micro base station also does not perform joint transmission with the macro base station, the first micro base station performs joint transmission with the macro base station and the second micro base station does not perform joint transmission with the macro base station, the first micro base station does not perform joint transmission with the macro base station and the second micro base station performs joint transmission with the macro base station, and the first micro base station performs joint transmission with the macro base station and the second micro base station also performs joint transmission with the macro base station. Therefore, the number of combination modes is four in this case.

Specifically, for example, when the number of micro base stations that schedule the edge user in the ABS is N, the combination mode may be expressed as: $P(u_1, u_2, L\ u_N)$, $u_i \in \{0,1\}$, $i=1,2,L,N$, where j denotes a $j^{th}$ base station, uj is used to indicate whether a $j^{th}$ micro base station performs joint transmission with the macro base station. For example, $u_j=0$ may indicate that the $j^{th}$ micro base station does not need to perform joint transmission with the macro base station, that is, the $j^{th}$ micro base station transmits downlink data to its edge user independently; and $u_j=1$ may indicate that the $j^{th}$ micro base station needs to perform joint transmission with the macro base station.

Assuming that the number of micro base stations is N, because there are two cases for each micro base station (that is, the micro base station may perform joint transmission with the macro base station, and may not perform joint transmission with the macro base station), the N micro base stations may form $2^N$ combination modes.

The control device may determine a utility function value of each combination mode in the $2^N$ combination modes, and determine, according to a combination mode with a largest utility function value, a micro base station that needs to perform joint transmission with the macro base station.

Figure 2:
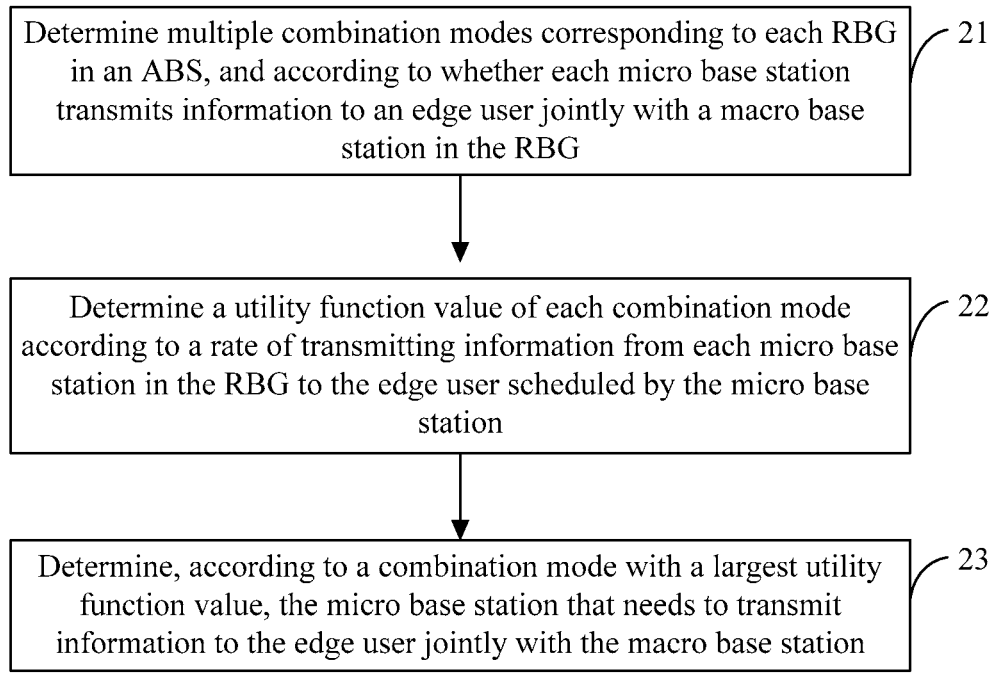
FIG. 2 is a schematic flowchart of determining a micro base station that needs to perform joint transmission with a macro base station in an embodiment of the present invention.

Optionally, referring to FIG. 2, the determining a combination mode, and determining, according to a utility function value of the combination mode, the micro base station that needs to transmit information to the edge user jointly with the macro base station may include:

21: Corresponding to each resource block group (Resource Block Group, RBG) in the ABS, determine multiple combination modes according to whether each micro base station transmits information to the edge user jointly with the macro base station in the RBG.

The multiple combination modes may form a combination mode set.

An RBG is a basic resource unit for user scheduling by a micro base station, and in each RBG, one micro base station usually can schedule only one user.

When the number of micro base stations is N, the number of combination modes included in the combination mode set in each RBG is: $2^N$.

22: Determine a utility function value of each combination mode according to a rate at which each micro base station transmits information in the RBG to the edge user scheduled by the micro base station.

A calculation formula of the utility function value of the combination mode may be:

$$f_i = \sum_{j=1}^{N} PF_j, \text{ or } f_i = \sum_{j=1}^{N} (R\_ins)_j,$$

where: $f_i$ denotes a utility function value of an $i^{th}$ combination mode, $PF_j$ denotes a proportional fair (Proportional Fair, PF) parameter of an edge user scheduled by the $j^{th}$ micro base station in the $i^{th}$ combination mode, N is the number of micro base stations that schedule the edge user in the ABS, and a calculation formula of $PF_j$ is:

$$PF_j = \frac{(R\_ins)_j}{(R\_avg)_j},$$

where: $(R\_ins)^j$ denotes an instantaneous rate of the edge user scheduled in the RBG by the $j^{th}$ micro base station in the $i^{th}$ combination mode, and $(R\_avg)_j$ denotes an average rate of the edge user scheduled in the RBG by the $j^{th}$ micro base station in the $i^{th}$ combination mode.

The instantaneous rate and average rate may refer to a downlink rate, that is, a rate at which the base station transmits information to the edge user.

An instantaneous rate of each edge user may be calculated according to a channel quality indicator (Channel Quality Indicator, CQI) reported by a user equipment (User Equipment, UE) of the edge user. For example, the instantaneous rate of the edge user may be obtained according to the CQI by using the prior art.

An average rate of the edge user refers to an average rate obtained by averaging, over a set period of time, instantaneous rates of the edge user scheduled in the RBG.

The instantaneous rate of the edge user may be obtained according to a transmission time interval (Transmission Time Interval, TTI). That is, statistics may be collected for a downlink data amount within each TTI, and an instantaneous rate corresponding to each TTI may be obtained according to the downlink data amount within the TTI and a time occupied by the TTI; and an instantaneous rate corresponding to a TTI occupied by each RBG in a time domain is determined as the instantaneous rate of the edge user scheduled in the RBG by the $j^{th}$ micro base station, and instantaneous rates corresponding to a set number of TTIs are averaged to obtain the average rate of the edge user scheduled in the RBG by the $j^{th}$ micro base station.

23: Determine, according to a combination mode with a largest utility function value, the micro base station that needs to transmit information to the edge user jointly with the macro base station.

Specifically, this step may refer to that a micro base station that needs to perform joint transmission with the macro base station and is indicated in the combination mode with the largest utility function value is finally determined as the micro base station that needs to perform joint transmission with the macro base station.

For example, a utility function value of P(0,1,L,0) is the largest, a micro base station meeting $u_j=1$, that is, the micro base station that needs to perform joint transmission with the macro base station and is indicated in the combination mode, for example, the second micro base station, is a micro base station that needs to perform joint transmission with the macro base station. It should be understood that, the combination mode may be used to indicate that one or more micro base stations need to perform joint transmission with the macro base station. For example, when multiple micro base stations meeting $u_j=1$ exist in the combination mode with the largest utility function value, the micro base station that needs to perform joint transmission with the macro base station includes the multiple micro base stations meeting $u_i=1$.

12: The control device instructs the macro base station and the micro base station that needs to transmit information to the edge user jointly with the macro base station, to transmit information to the edge user in the ABS.

Herein, when the control device and the macro base station are not located in a same device and the control device and the micro base station are not located in a same device, the control device may send indication information to the macro base station and the micro base station, so as to instruct the macro base station and the micro base station to perform the joint transmission. Alternatively, when the control device and one of the macro base station and the micro base station are located in a same device, the control device may send indication information to a base station (the macro base station or the micro base station) that is not located in the same device, and transmit the indication information to the base station (the micro base station or the macro base station) that is located in the same device by using an internal interface, so that the macro base station and the micro base station perform the joint transmission.

Figure 3:
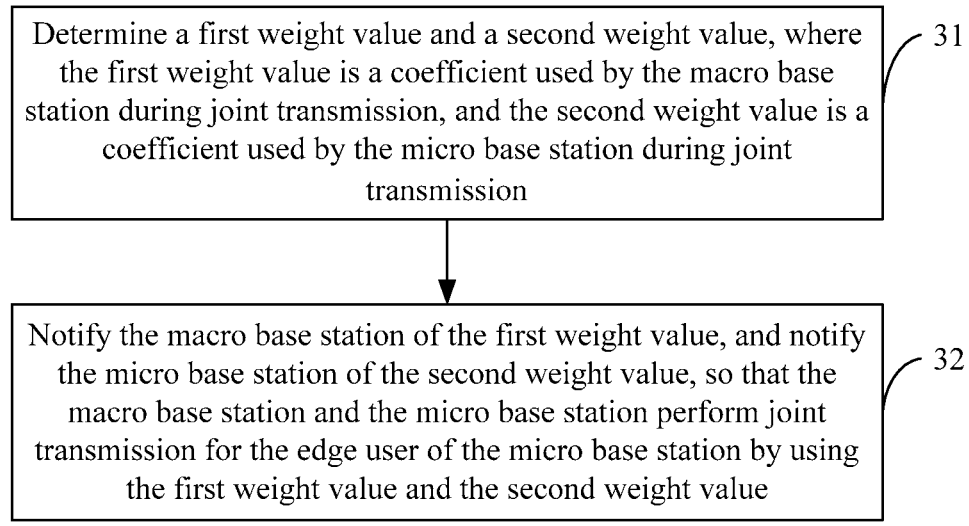
FIG. 3 is a schematic flowchart of macro-micro joint transmission in an embodiment of the present invention.

Referring to FIG. 3, a procedure for performing joint transmission may include:

31: Determine a first weight value and a second weight value, where the first weight value is a coefficient used by the macro base station during joint transmission, and the second weight value is a coefficient used by the micro base station during joint transmission.

For example, during joint transmission, original signals generated by the macro base station and the micro base station are the same and are denoted by x, the first weight value is denoted by w1, and the second weight value is denoted by w2; in this case, during joint transmission, a signal transmitted by the macro base station is w1×x, and a signal transmitted by the micro base station is w2×x.

Optionally, the determining a first weight value and a second weight value may include:

A first channel matrix between the edge user of each micro base station and the macro base station is calculated separately, and a second channel matrix between the edge user of each micro base station and the micro base station is calculated separately. Herein, the micro base station refers to a micro base station that needs to perform joint transmission with the macro base station, the edge user of the micro base station may transmit a sounding reference signal (SRS), the macro base station may estimate the first channel matrix according to the received SRS, and the micro base station may estimate the second channel matrix according to the received SRS. The first channel matrix and the second channel matrix may be obtained according to the SRS by using an existing general channel estimation algorithm.

Singular value decomposition (SVD) is performed on a transpose of the first channel matrix to obtain the first weight value, and SVD is performed on a transpose of the second channel matrix to obtain the second weight value.

For example, during SVD, U, S and V matrices may be obtained, and a conjugate transpose of the V matrix may be determined as the foregoing weight value. When SVD is performed on the transpose of the first channel matrix, the first weight value is obtained; when SVD is performed on the transpose of the second channel matrix, the second weight value is obtained.

Further, when the macro base station simultaneously performs joint transmission with at least two micro base stations, orthogonalization processing may be performed on the first weight value corresponding to each micro base station, so that different first weight values corresponding to different micro base stations are mutually orthogonal. For example, when the macro base station simultaneously performs joint transmission with a first micro base station and a second micro base station, the macro base station may perform estimation according to an SRS transmitted by an edge user of each micro base station to obtain a first channel matrix corresponding to each micro base station, and then perform SVD on a transpose of the first channel matrix corresponding to each micro base station to obtain: a first weight value corresponding to the first micro base station and a first weight value corresponding to the second micro base station. That is, the macro base station may perform estimation according to an SRS transmitted by an edge user scheduled by the first micro base station to obtain a first channel matrix between the edge user scheduled by the first micro base station and the macro base station. The macro base station performs estimation according to an SRS transmitted by an edge user scheduled by the second micro base station to obtain a first channel matrix between the edge user scheduled by the second micro base station and the macro base station, performs SVD on a transpose of the first channel matrix between the edge user scheduled by the first micro base station and the macro base station to obtain the first weight value corresponding to the first micro base station, performs SVD on a transpose of the first channel matrix between the edge user scheduled by the second micro base station and the macro base station to obtain the first weight value corresponding to the second micro base station, and may perform orthogonalization processing on the two first weight values, so that the macro base station uses the first weight values after orthogonalization processing to perform joint transmission with the first micro base station and the second micro base station separately.

That is, optionally, the determining a first weight value corresponding to the macro base station and a second weight value corresponding to each micro base station includes:

when the number of micro base stations that need to transmit information to the edge user jointly with the macro base station is one, estimating a first channel matrix between the edge user and the macro base station, and a second channel matrix between the edge user and the micro base station that needs to transmit information to the edge user jointly with the macro base station; and performing singular value decomposition SVD on a transpose of the first channel matrix to obtain the first weight value corresponding to the macro base station, and performing SVD on a transpose of the second channel matrix to obtain the second weight value corresponding to the micro base station that needs to transmit information to the edge user jointly with the macro base station; or when the number of micro base stations that simultaneously need to transmit information to the edge user jointly with the macro base station is at least two, estimating, corresponding to each micro base station and each scheduled edge user, a channel matrix between each edge user scheduled by each micro base station and the macro base station to obtain a first channel matrix corresponding to each micro base station, and estimating a second channel matrix between each edge user scheduled by each micro base station and each micro base station; and performing SVD on a transpose of the first channel matrix corresponding to each micro base station to obtain multiple first weight values, performing orthogonalization processing on the multiple first weight values to obtain the first weight value corresponding to the macro base station, where the first weight value includes a first weight value corresponding to each micro base station, and performing SVD on a transpose of the second channel matrix to obtain the second weight value corresponding to each micro base station.

It should be understood that, because the micro base station that needs to transmit information to the edge user jointly with the macro base station may be determined corresponding to each RBG of the ABS, when the number of micro base stations that need to transmit information to the edge user jointly with the macro base station is one, the edge user refers to an edge user scheduled in the RBG by the micro base station that needs to transmit information to the edge user jointly with the macro base station. When the number of micro base stations that need to transmit information to the edge user jointly with the macro base station is at least two, each edge user scheduled by each micro base station refers to an edge user scheduled by the micro base station in a corresponding RBG, where each micro base station corresponds to one RBG.

32: Notify the macro base station of the first weight value, and notify the micro base station of the second weight value, so that the macro base station and the micro base station perform joint transmission for the edge user of the micro base station by using the first weight value and the second weight value separately.

Herein, the notification may be implemented as follows: when the control device and the macro base station and the micro base station are disposed independently, the control device sends the first weight value and the second weight to the macro base station and the micro base station separately. When the control device and one of the base stations are located in a same device, the notification may be implemented by using an internal interface of the device.

The joint transmission may refer to that the macro base station and the micro base station weight a same original signal according to weight values received by them and send the weighted signals to the edge user of the micro base station. For example, if the micro base station that performs joint transmission with the macro base station is the first micro base station, the control device may send the first weight value to the macro base station, where the first weight value is denoted by w1, and the control device sends the second weight value to the first micro base station, where the second weight value is denoted by w2. Assuming that the same original signal generated by the macro base station and the micro base station is denoted by x, a signal transmitted by the macro base station to the edge user of the first micro base station is w1×x, and a signal transmitted by the first micro base station to the edge user of the first micro base station is w2×x.

In this embodiment, macro-micro joint transmission is performed for the edge user of the micro base station, which can avoid the resource waste problem caused by that the macro base station does not send data in the ABS subframe, and can reduce the resource loss of the macro base station. Further, macro-micro joint transmission can further improve edge user performance and enhance eICIC performance.

Figure 4:
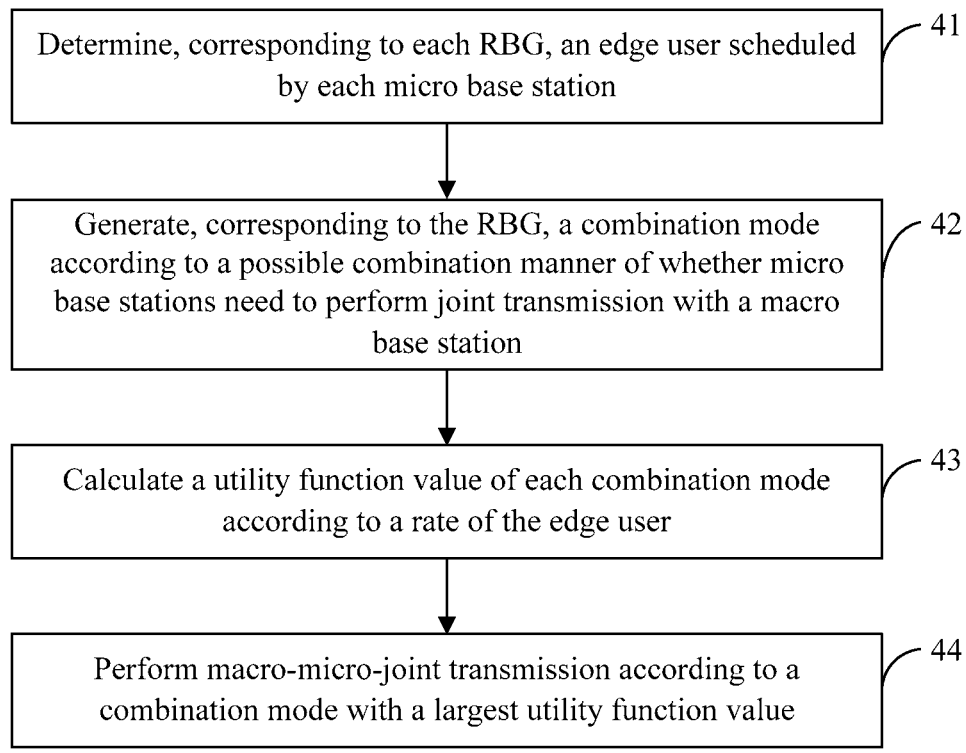
FIG. 4 is a schematic flowchart of another downlink transmission method in a heterogeneous network provided in an embodiment of the present invention.
Figure 5:
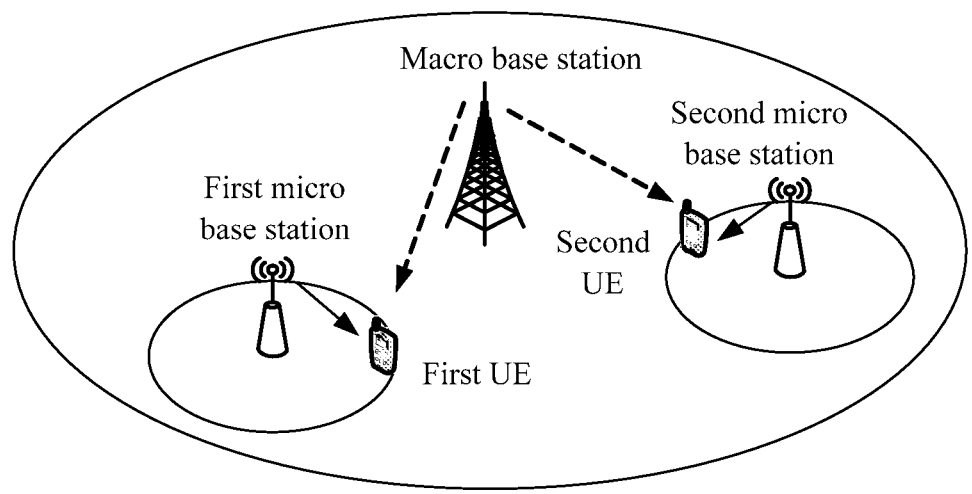
FIG. 5 is a schematic structural diagram of a heterogeneous network corresponding to FIG. 4.

FIG. 4 is a schematic flowchart of another downlink transmission method in a heterogeneous network provided in an embodiment of the present invention, and FIG. 5 is a schematic structural diagram of the heterogeneous network corresponding to FIG. 4. In this embodiment, micro base stations that schedule edge users in an ABS include a first micro base station and a second micro base station, and the scheduled edge users are a first UE and a second UE respectively. In this embodiment, a macro base station may be a marco, and the micro base station may be a micro, pico or Femto.

Referring to FIG. 4, this embodiment includes:

41: Determine, corresponding to each RBG, an edge user scheduled by each micro base station.

In each RBG of an ABS, a user scheduled by the micro base station may be determined according to a priority of the user. For example, a user having the highest priority is determined as the user scheduled by the micro base station, and the priority of the user may be determined according to PF, a signal to interference plus noise ratio (Signal to Interference plus Noise Ratio, SINR), and so on. After a user scheduled by the micro base station in each RBG is determined, it may be determined, according to a path loss between the user scheduled in each RBG and the micro base station and a path loss between the user scheduled in each RBG and the macro base station, whether the user scheduled in the RBG is an edge user. For example, when a difference between the two path losses falls within a set range, it may be determined that the user is an edge user; otherwise, it is not an edge user. By using this method, it can be determined whether a user scheduled in each RBG is an edge user. Once it is clear whether the user corresponding to each RBG is an edge user, the edge user scheduled by each micro base station is determined.

As shown in FIG. 5, the edge user scheduled by the first micro base station is the first UE, and the edge user scheduled by the second micro base station is the second UE.

42: Generate, corresponding to the RBG, a combination mode according to a possible combination manner of whether micro base stations need to perform joint transmission with a macro base station.

For example, when the number of micro base stations is two, possible combination modes include: P(0, 0), P(0, 1), P(1, 0) and P(1, 1), where P(0, 0) indicates that two micro base stations perform transmission independently, P(0, 1) indicates that the first micro base station performs transmission independently and the second micro base station performs joint transmission with the macro base station, P(1, 0) indicates that the first micro base station performs joint transmission with the macro base station and the second micro base station performs transmission independently, and P(1, 1) indicates that both the two micro base stations perform joint transmission with the macro base station.

43: Calculate a utility function value of each combination mode according to a rate of the edge user.

For example, calculation may be performed according to an instantaneous rate and an average rate, or calculation may be performed according to the instantaneous rate. For a specific calculation formula, refer to the content shown in 22.

44: Perform macro-micro joint transmission according to a combination mode with a largest utility function value.

For example, if the utility function value of P(0, 1) is the largest, macro-micro joint transmission is performed only for the second UE in FIG. 5 in the RBG, and for the first UE, the first micro base station performs transmission independently and the macro base station does not perform transmission.

In this embodiment, in an ABS subframe, the macro base station and the micro base station perform joint transmission on the edge user of the micro base station, performance of the edge user of the micro base station can be improved, the macro base station ABS loss can be compensated, and static eICIC performance can be enhanced.

FIG. 6 is a schematic structural diagram of a control device provided in an embodiment of the present invention. The device may be a control device that controls a macro base station and a micro base station. The device 60 includes a determining module 61 and an instructing module 62. The determining module 61 is configured to: when one or more micro base stations need to schedule an edge user in an ABS, determine, by the control device, at least one micro base station that needs to transmit information to the edge user jointly with a macro base station from the one or more micro base stations. The instructing module 62 is configured to instruct the macro base station and the micro base station that needs to transmit information to the edge user jointly with the macro base station, to transmit information to the edge user in the ABS.

Optionally, the determining module is specifically configured to:

when the number of micro base stations that schedule the edge user in the ABS is one, determine that the micro base station that schedules the edge user in the ABS is the micro base station that needs to transmit information to the edge user jointly with the macro base station; or when the number of micro base stations that schedule the edge user in the ABS is at least two, determine a combination mode, and determine, according to a utility function value of the combination mode, the micro base station that needs to transmit information to the edge user jointly with the macro base station, where the combination mode is used to indicate whether each micro base station transmits information to the edge user jointly with the macro base station.

Optionally, the determining module is specifically configured to:

corresponding to each RBG in the ABS, determine multiple combination modes according to whether each micro base station transmits information to the edge user jointly with the macro base station in the RBG;

determine a utility function value of each combination mode according to a rate at which each micro base station transmits information in the RBG to the edge user scheduled by the micro base station; and determine, according to a combination mode with a largest utility function value, the micro base station that needs to transmit information to the edge user jointly with the macro base station.

Optionally, the utility function value determined by the determining module is:

$$f_i = \sum_{j=1}^{N} PF_j, \text{ or } f_i = \sum_{j=1}^{N} (R\_ins)_j,$$

where: $f_i$ denotes a utility function value of an $i^{th}$ combination mode, $PF_j$ denotes a proportional fair PF parameter of an edge user scheduled by a $j^{th}$ micro base station in the $i^{th}$ combination mode, N is the number of micro base stations that schedule the edge user in the ABS, and a calculation formula of $PF_j$ is:

$$PF_j = \frac{(R\_ins)_j}{(R\_avg)_j},$$

where: $(R\_ins)_j$ denotes an instantaneous rate of the edge user scheduled in the RBG by the $j^{th}$ micro base station in the $i^{th}$ combination mode, and $(R\_avg)_j$ denotes an average rate of the edge user scheduled in the RBG by the $j^{th}$ micro base station in the $i^{th}$ combination mode.

Optionally, the determining module is further configured to determine a first weight value corresponding to the macro base station and a second weight value corresponding to each micro base station, where each micro base station is each micro base station that needs to transmit information to the edge user jointly with the macro base station; and the instructing module is further configured to send the first weight value corresponding to the macro base station to the macro base station, and send the second weight value corresponding to each micro base station to each micro base station, so that the macro base station and each micro base station jointly transmit information to the edge user according to the first weight value and the second weight value corresponding to each micro base station separately.

Optionally, the determining module is specifically configured to:

when the number of micro base stations that need to transmit information to the edge user jointly with the macro base station is one, estimate a first channel matrix between the edge user and the macro base station, and a second channel matrix between the first edge user and the micro base station that needs to transmit information to the edge user jointly with the macro base station; and perform SVD on a transpose of the first channel matrix to obtain the first weight value corresponding to the macro base station, and perform SVD on a transpose of the second channel matrix to obtain the second weight value corresponding to the micro base station that needs to transmit information to the edge user jointly with the macro base station; or when the number of micro base stations that simultaneously need to transmit information to the edge user jointly with the macro base station is at least two, estimate, corresponding to each micro base station and each scheduled edge user, a channel matrix between each edge user scheduled by each micro base station and the macro base station to obtain a first channel matrix corresponding to each micro base station, and estimate a second channel matrix between each edge user scheduled by each micro base station and each micro base station; and perform SVD on a transpose of the first channel matrix corresponding to each micro base station to obtain multiple first weight values, perform orthogonalization processing on the multiple first weight values to obtain the first weight value corresponding to the macro base station, where the first weight value includes a first weight value corresponding to each micro base station, and perform SVD on a transpose of the second channel matrix to obtain the second weight value corresponding to each micro base station.

As shown in FIG. 7, another control device is provided. The device 70 includes a processor 71 and a sender 72. The processor 71 is configured to: when one or more micro base stations need to schedule an edge user in an ABS, determine, by the control device, at least one micro base station that needs to transmit information to the edge user jointly with a macro base station from the one or more micro base stations. The sender 72 is configured to instruct the macro base station and the micro base station that needs to transmit information to the edge user jointly with the macro base station, to transmit information to the edge user in the ABS.

Optionally, the processor is specifically configured to:

when the number of micro base stations that schedule the edge user in the ABS is one, determine that the micro base station that schedules the edge user in the ABS is the micro base station that needs to transmit information to the edge user jointly with the macro base station; or when the number of micro base stations that schedule the edge user in the ABS is at least two, determine a combination mode, and determine, according to a utility function value of the combination mode, the micro base station that needs to transmit information to the edge user jointly with the macro base station, where the combination mode is used to indicate whether each micro base station transmits information to the edge user jointly with the macro base station.

Optionally, the processor is specifically configured to:

corresponding to each RBG in the ABS, determine multiple combination modes according to whether each micro base station transmits information to the edge user jointly with the macro base station in the RBG;

determine a utility function value of each combination mode according to a rate at which each micro base station transmits information in the RBG to the edge user scheduled by the micro base station; and determine, according to a combination mode with a largest utility function value, the micro base station that needs to transmit information to the edge user jointly with the macro base station.

Optionally, the utility function value determined by the processor is:

$$f_i = \sum_{j=1}^{N} PF_j, \text{ or } f_i = \sum_{j=1}^{n} (R\_ins)_j,$$

where: $f_i$ denotes a utility function value of an $i^{th}$ combination mode, $PF_j$ denotes a proportional fair PF parameter of an edge user scheduled by a $j^{th}$ micro base station in the $i^{th}$ combination mode, N is the number of micro base stations that schedule the edge user in the ABS, and a calculation formula of $PF_j$ is:

$$PF_j = \frac{(R\_ins)_j}{(R\_avg)_j},$$

where: $(R\_ins)_j$ denotes an instantaneous rate of the edge user scheduled in the RBG by the $j^{th}$ micro base station in the $i^{th}$ combination mode, and $(R\_avg)_j$ denotes an average rate of the edge user scheduled in the RBG by the $j^{th}$ micro base station in the $i^{th}$ combination mode.

Optionally, the processor is further configured to determine a first weight value corresponding to the macro base station and a second weight value corresponding to each micro base station, where each micro base station is each micro base station that needs to transmit information to the edge user jointly with the macro base station; and the sender is further configured to send the first weight value corresponding to the macro base station to the macro base station, and send the second weight value corresponding to each micro base station to each micro base station, so that the macro base station and each micro base station jointly transmit information to the edge user according to the first weight value and the second weight value corresponding to each micro base station separately.

Optionally, the processor is specifically configured to:

when the number of micro base stations that need to transmit information to the edge user jointly with the macro base station is one, estimate a first channel matrix between the edge user and the macro base station, and a second channel matrix between the edge user and the micro base station that needs to transmit information to the edge user jointly with the macro base station; and perform SVD on a transpose of the first channel matrix to obtain the first weight value corresponding to the macro base station, and perform SVD on a transpose of the second channel matrix to obtain the second weight value corresponding to the micro base station that needs to transmit information to the edge user jointly with the macro base station; or when the number of micro base stations that simultaneously need to transmit information to the edge user jointly with the macro base station is at least two, estimate, corresponding to each micro base station and each scheduled edge user, a channel matrix between each edge user scheduled by each micro base station and the macro base station to obtain a first channel matrix corresponding to each micro base station, and estimate a second channel matrix between each edge user scheduled by each micro base station and each micro base station; and perform SVD on a transpose of the first channel matrix corresponding to each micro base station to obtain multiple first weight values, perform orthogonalization processing on the multiple first weight values to obtain the first weight value corresponding to the macro base station, where the first weight value includes a first weight value corresponding to each micro base station, and perform SVD on a transpose of the second channel matrix to obtain the second weight value corresponding to each micro base station.

It should be understood that, the device may further include general parts such as a receiver, a memory, and an input and output apparatus.

In this embodiment, macro-micro joint transmission is performed for the edge user of the micro base station, which can avoid the resource waste problem caused by that the macro base station does not send data in the ABS subframe, and can reduce the resource loss of the macro base station. Further, macro-micro joint transmission can further improve edge user performance and enhance eICIC performance.

A procedure on the side of a control device is described above. Referring to FIG. 8, the following steps may be performed on the side of a base station:

81: A base station acquires indication information generated by a control device, where the indication information is generated after the control device determines a micro base station that needs to transmit, jointly with a macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in an ABS.

Herein, when the control device and the base station are located in different devices, the control device may send the indication information to the base station; when the control device and the base station are located in a same device, the control device may transmit the indication information by using an internal interface.

For details about determining, by the control device, a micro base station that needs to perform joint transmission with a macro base station, refer to the description of the foregoing control device.

82: The base station transmits information to the edge user in the ABS according to the indication information.

Optionally, before the transmitting, by the base station, information to the edge user in the ABS according to the indication information, the method further includes:

acquiring, by the base station, a weight value obtained by the control device, where the weight value is obtained after the control device performs singular value decomposition SVD on a transpose of a channel matrix between the base station and the edge user; and the transmitting information to the edge user in the ABS includes: transmitting information to the edge user in the ABS according to the weight value.

Herein, when the base station is the macro base station, a received weight value may be a first weight, and when the base station is the micro base station, a received weight value may be a second weight value. For a specific calculation method of the first weight value and the second weight value, refer to the description of the foregoing control device.

Figure 9:
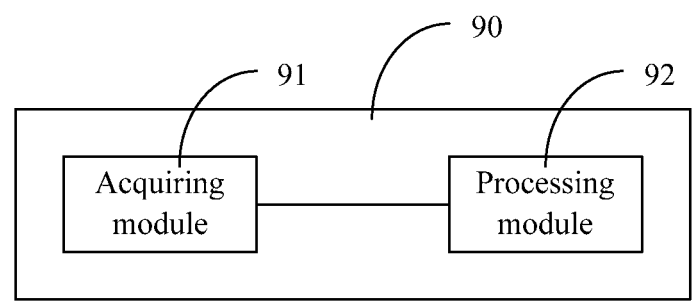
FIG. 9 is a schematic structural diagram of a base station provided in an embodiment of the present invention.

Optionally, when the base station is the macro base station, and the number of micro base stations that simultaneously need to transmit information to the edge user jointly with the macro base station is at least two, the weight value acquired by the macro base station includes mutually orthogonal weight values corresponding to each micro base station. For example, the control device orthogonalizes multiple first weight values obtained after SVD to obtain orthogonalized first weight values after and send the orthogonalized first weight values to the macro base station. For details, refer to the description of the control device Correspondingly, an embodiment of the present invention further provides a base station. Referring to FIG. 9, the base station 90 includes an acquiring module 91 and a processing module 92. The acquiring module 91 is configured to acquire indication information generated by a control device, where the indication information is generated after the control device determines a micro base station that needs to transmit, jointly with a macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in an almost blank subframe ABS. The processing module 92 is configured to transmit information to the edge user in the ABS according to the indication information.

Optionally, the acquiring module is further configured to acquire a weight value obtained by the control device, where the weight value is obtained after the control device performs singular value decomposition SVD on a transpose of a channel matrix between the base station and the edge user; and the processing module is specifically configured to transmit information to the edge user in the ABS according to the weight value and the indication information.

Optionally, when the base station is the macro base station, and the number of micro base stations that simultaneously need to transmit information to the edge user jointly with the macro base station is at least two, the weight value acquired by the acquiring module includes mutually orthogonal weight values corresponding to each micro base station.

In hardware implementation, the foregoing acquiring module may specifically be a receiver or a transceiver, and the foregoing processing module may specifically be a processor. In addition, the base station may further include a memory, an antenna, a baseband processing part, an intermediate radiofrequency processing part, an input and output apparatus, and other general parts.

That is, the base station may include a receiver and a processor. The receiver is configured to acquire indication information generated by a control device, where the indication information is generated after the control device determines a micro base station that needs to transmit, jointly with a macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in an almost blank subframe ABS. The processor is configured to transmit information to the edge user in the ABS according to the indication information.

Optionally, the receiver is further configured to acquire a weight value obtained by the control device, where the weight value is obtained after the control device performs singular value decomposition SVD on a transpose of a channel matrix between the base station and the edge user; and the processor is specifically configured to transmit information to the edge user in the ABS according to the weight value and the indication information.

Optionally, when the base station is the macro base station, and the number of micro base stations that simultaneously need to transmit information to the edge user jointly with the macro base station is at least two, the weight value acquired by the receiver includes mutually orthogonal weight values corresponding to each micro base station.

In this embodiment, macro-micro joint transmission is performed for the edge user of the micro base station, which can avoid the resource waste problem caused by that the macro base station does not send data in the ABS subframe, and can reduce the resource loss of the macro base station. Further, macro-micro joint transmission can further improve edge user performance and enhance eICIC performance.

Figure 10:
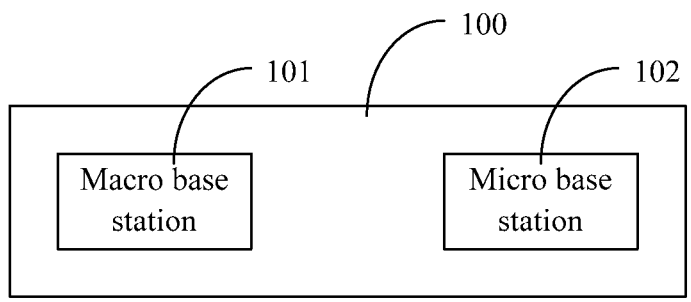
FIG. 10 is a schematic structural diagram of a heterogeneous system provided in an embodiment of the present invention.

Referring to FIG. 10, an embodiment of the present invention further provides a heterogeneous system. The system 100 includes a macro base station 101 and a micro base station 102. The macro base station 101 is configured to transmit information to an edge user of the micro base station in an ABS according to indication information generated by a control device. The micro base station 102 is configured to transmit information to the edge user in the ABS according to indication information generated by the control device, where the indication information is generated after the control device determines a micro base station that needs to transmit, jointly with the macro base station, information to an edge user scheduled by the micro base station, and the indication information is used to instruct the macro base station and the micro base station that needs to transmit, jointly with the macro base station, information to the edge user scheduled by the micro base station, to transmit information to the edge user in the almost blank subframe ABS.

Optionally, the macro base station 101 is further configured to acquire a first weight value obtained by the control device, where the first weight value is obtained after the control device performs SVD on a transpose of a first channel matrix between the edge user and the macro base station, so as to transmit information to the edge user by using the first weight value in the ABS according to the indication information; and the micro base station 102 is further configured to acquire a second weight value sent by the control device, where the second weight value is obtained after the control device performs SVD on a transpose of a second channel matrix between the edge user and the micro base station, so as to transmit information to the edge user by using the second weight value in the ABS according to the indication information.

Optionally, when the number of micro base stations that need simultaneously to transmit information to the edge user jointly with the macro base station is at least two, the first weight value acquired by the macro base station includes mutually orthogonal weight values corresponding to each micro base station that simultaneously needs to transmit information to the edge user jointly with the macro base station.

In this embodiment, macro-micro joint transmission is performed for the edge user of the micro base station, which can avoid the resource waste problem caused by that the macro base station does not send data in the ABS subframe, and can reduce the resource loss of the macro base station. Further, macro-micro joint transmission can further improve edge user performance and enhance eICIC performance.

It can be clearly understood by persons skilled in the art that, for the purpose of convenient and brief description, division of the foregoing function modules is taken as an example for illustration, in actual implementation, the foregoing functions can be allocated to different modules and implemented according to the need, that is, inner structure of the apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected as required to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a control device) or a processor to perform all or a part of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A downlink transmission method in a heterogeneous network, the method comprising:
when two or more micro base stations need to schedule an edge user in an almost blank subframe (ABS), determining, by a control device,
(a) combination modes indicating an ability of the two or more micro base stations to transmit information to the edge user jointly with a macro base station in a resource block group (RBG) in the ABS,
(b) a utility function value of each of the combination modes determined from rates at which the two or more micro base stations in the combination mode transmit information in the RBG to the edge user, and
(c) at least one of the two or more micro base stations that need to transmit information to the edge user jointly with the macro base station according to a combination mode with a largest utility function value; and
instructing, by the control device, the macro base station and the at least one of the two or more micro base stations that need to transmit information to the edge user jointly with the macro base station, to transmit information to the edge user in the ABS.

2. The method according to claim 1, wherein the utility function value of each combination mode is:

$$f_i = \sum_{j=1}^{N} PF_j, \text{ or } f_i = \sum_{j=1}^{N} (R\_ins)_j,$$

wherein: $f_i$ denotes a utility function value of an $i^{th}$ combination mode, $PF_j$ denotes a proportional fair PF parameter of an edge user scheduled by a $j^{th}$ micro base station in the $i^{th}$ combination mode, N is the number of micro base stations that schedule the edge user in the ABS, and a calculation formula of $PF_j$ is:

$$PF_j = \frac{(R\_ins)_j}{(R\_avg)_j},$$

wherein: $(R\_ins)_j$ denotes an instantaneous rate of the edge user scheduled in the RBG by the $j^{th}$ micro base station in the $i^{th}$ combination mode, and $(R_{13}\ avg)_j$ denotes an average rate of the edge user scheduled in the RBG by the $j^{th}$ micro base station in the $i^{th}$ combination mode.

3. The method according to claim 1, wherein instructing the macro base station and the micro base station to transmit information to the edge user in the ABS comprises:
determining a first weight value corresponding to the macro base station and a second weight value corresponding to each micro base station;
sending the first weight value to the macro base station; and
sending the second weight value to each micro base station, so that the macro base station and each micro base station jointly transmit information to the edge user according to the first weight value and the second weight value corresponding to each micro base station separately, wherein each micro base station is a micro base station that needs to transmit information to the edge user jointly with the macro base station.

4. The method according to claim 3, wherein the determining a first weight value corresponding to the macro base station and a second weight value corresponding to each micro base station comprises:
(a) estimating, corresponding to each micro base station and each scheduled edge user, a channel matrix between each edge user scheduled by each micro base station and the macro base station to obtain a first channel matrix corresponding to each micro base station,
(b) estimating a second channel matrix between each scheduled edge user and each micro base station,
(c) performing SVD on a transpose of the first channel matrix corresponding to each micro base station to obtain multiple first weight values,
(d) performing orthogonalization processing on the multiple first weight values to obtain the first weight value corresponding to the macro base station, wherein each first weight value comprises a first weight value corresponding to each micro base station, and
(e) performing SVD on a transpose of the second channel matrix to obtain the second weight value corresponding to each micro base station.

5. A downlink transmission method in a heterogeneous network for jointly transmitting, from macro and micro base stations, information to an edge user scheduled by the micro base station, the method comprising:
acquiring, by the macro base station, indication information instructing the macro base station and the micro base station to transmit information to the edge user in an almost blank subframe (ABS), where the indication information is determined from
(a) combination modes indicating an ability of each of two or more micro base stations to transmit information to the edge user jointly with the macro base station in a resource block group (RBG) in the ABS,
(b) a utility function value of each of the combination modes determined from rates at which the two or more micro base stations in the combination modes transmit information in the RBG to the edge user, such that the micro base station for jointly transmitting with the macro base station to the edge user is the micro station in a combination mode with a largest utility function value; and
transmitting, by the base station, information to the edge user in the ABS according to the indication information.

6. The method according to claim 5, wherein the indication information includes acquiring, by the base station, a weight value obtained after performing singular value decomposition (SVD) on a transpose of a channel matrix between the base station and the edge user; and
transmitting information to the edge user in the ABS according to the indication information and the weight value.

7. A control device comprising:
a processor configured to, when two or more micro base stations need to schedule an edge user in an almost blank subframe (ABS), determine
(a) combination modes indicating an ability of the two or more micro base stations to transmit information to the edge user jointly with a macro base station in a resource block group (RBG) in the ABS,
(b) a utility function value of each of the combination modes determined from rates at which the two or more micro base stations in the combination mode transmit information in the RBG to the edge user, and
(c) at least one of the two or more micro base stations that need to transmit information to the edge user jointly with the macro base station according to a combination mode with a largest utility function value; and
a transceiver configured to instruct the macro base station and the at least one of the two or more micro base stations that need to transmit information, to transmit information to the edge user in the ABS.

8. The control device according to claim 7, wherein the utility function value is:

$$f_i = \sum_{j=1}^{N} PF_j, \text{ or } f_i = \sum_{j=1}^{N} (\text{R\_ins})_j,$$

wherein: $f_i$ denotes a utility function value of an $i^{th}$ combination mode, $PF_j$ denotes a proportional fair PF parameter of an edge user scheduled by a $j^{th}$ micro base station in the $i^{th}$ combination mode, N is the number of micro base stations that schedule the edge user in the ABS, and a calculation formula of $PF_j$ is:

$$PF_j = \frac{(\text{R\_ins})_j}{(\text{R\_avg})_j},$$

wherein: $(\text{R\_ins})_j$ denotes an instantaneous rate of the edge user scheduled in the RBG by the $j^{th}$ micro base station in the $i^{th}$ combination mode, and $(\text{R\_avg})_j$ denotes an average rate of the edge user scheduled in the RBG by the $j^{th}$ micro base station in the $i^{th}$ combination mode.

9. The control device according to claim 7, wherein
the processor is further configured to determine a first weight value corresponding to the macro base station and a second weight value corresponding to each micro base station, wherein each micro base station needs to transmit information to the edge user jointly with the macro base station; and
the transceiver is further configured to send the first weight value to the macro base station, and send the second weight value to each micro base station, so that the macro base station and each micro base station jointly transmit information to the edge user according to the first weight value and the second weight value corresponding to each micro base station.

10. The control device according to claim 9, wherein the processor is further configured to provide the following to determine the first and second weight values:
(a) estimate, corresponding to each micro base station and each scheduled edge user, a channel matrix between each edge user scheduled by each micro base station and the macro base station to obtain a first channel matrix corresponding to each micro base station,
(b) estimate a second channel matrix between each scheduled edge user and each micro base station,
(c) perform SVD on a transpose of the first channel matrix corresponding to each micro base station to obtain multiple first weight values,
(d) perform orthogonalization processing on the multiple first weight values to obtain the first weight value corresponding to the macro base station, wherein each first weight value comprises a first weight value corresponding to each micro base station, and
(e) perform SVD on a transpose of the second channel matrix to obtain the second weight value corresponding to each micro base station.

11. A macro base station for transmitting, jointly with a micro base station, information to an edge user scheduled by the micro base station, the macro base station comprising:

a processor and non-transitory computer readable medium storing instructions for execution by the processor so as to configure the processor to provide the following:
  acquire indication information for instructing the macro base station and the micro base station, to transmit information to the edge user in an almost blank subframe (ABS), where the indication information is determined from
  (a) combination modes indicating an ability of each of two or more micro base stations to transmit information to the edge user jointly with the macro base station in a resource block group (RBG) in the ABS,
  (b) a utility function value of each of the combination modes determined from rates at which the two or more micro base stations in the combination modes transmit information in the RBG to the edge user, such that the micro base station for jointly transmitting with the macro base station to the edge user is the micro station in a combination mode with a largest utility function value; and
  a transceiver for transmitting information to the edge user in the ABS according to the indication information.

12. The base station according to claim 11, wherein the processor is further configured to:
  acquire a weight value obtained after the control device performs singular value decomposition (SVD) on a transpose of a channel matrix between the base station and the edge user; and
  transmit information to the edge user in the ABS according to the weight value and the indication information.

13. A heterogeneous system for jointly transmitting, from macro and micro base stations, information to an edge user scheduled by the micro base station comprising:
  a macro base station configured to transmit information to an edge user of the micro base station in an almost blank subframe (ABS) according to indication information generated by a control device; and
  a micro base station configured to transmit information to the edge user in the ABS according to the indication information, wherein
  the indication information instructs the macro base station and the micro base station to transmit information to the edge user in the ABS, where the indication information includes information determined from
  (a) combination modes indicating an ability of each of two or more micro base stations to transmit information to the edge user jointly with the macro base station in a resource block group (RBG) in the ABS, and
  (b) a utility function value of each of the combination modes determined from rates at which the two or more micro base stations in the combination mode transmit information in the RBG to the edge user.

14. The system according to claim 13, wherein
  the macro base station is further configured to acquire a first weight value obtained by the control device, wherein the first weight value is obtained after the control device performs singular value decomposition (SVD) on a transpose of a first channel matrix between the edge user and the macro base station, so as to transmit information to the edge user by using the first weight value in the ABS according to the indication information; and
  the micro base station is further configured to acquire a second weight value sent by the control device, wherein the second weight value is obtained after the control device performs SVD on a transpose of a second channel matrix between the edge user and the micro base station, so as to transmit information to the edge user by using the second weight value in the ABS according to the indication information.

15. The system according to claim 14, wherein the first and second weight values are provided by a control device configured to:
  (a) estimate, corresponding to each micro base station and each scheduled edge user, a channel matrix between each edge user scheduled by each micro base station and the macro base station to obtain a first channel matrix corresponding to each micro base station,
  (b) estimate a second channel matrix between each scheduled edge user and each micro base station,
  (c) perform SVD on a transpose of the first channel matrix corresponding to each micro base station to obtain multiple first weight values,
  (d) perform orthogonalization processing on the multiple first weight values to obtain the first weight value corresponding to the macro base station, wherein each first weight value comprises a first weight value corresponding to each micro base station, and
  (e) perform SVD on a transpose of the second channel matrix to obtain the second weight value corresponding to each micro base station.

16. The system according to claims 13, wherein the micro base station for jointly transmitting with the macro base station to the edge user is the micro station in a combination mode with a largest utility function value.

* * * * *